March 27, 1934.  S. GERRARD  1,953,012
SUPPORTING HORSE
Filed June 20, 1932
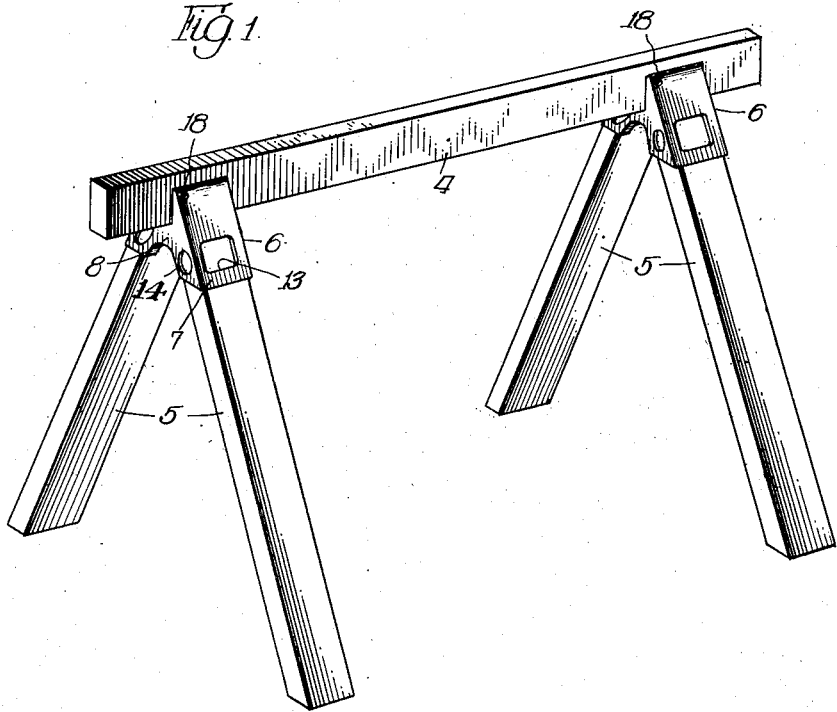
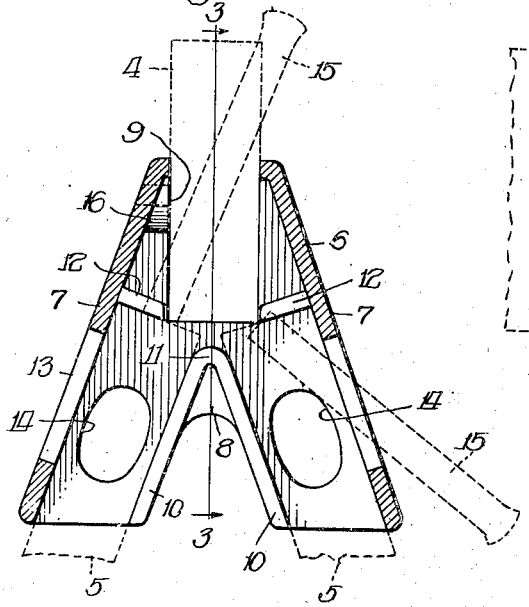
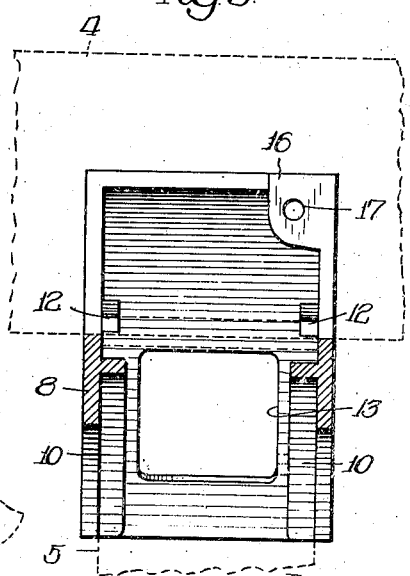
Inventor:
Sidney Gerrard,
By Kent W. Wonnell atty Patented Mar. 27, 1934

1,953,012

UNITED STATES PATENT OFFICE 1,953,012

SUPPORTING HORSE

Sidney Gerrard, Winnetka, Ill., assignor to Crane Packing Company, a corporation of Illinois Application June 20, 1932, Serial No. 618,152

3 Claims. (Cl. 304—5)

This invention relates in general to supporting horses for use by workmen, mechanics, for supporting tables, planks, and for many other uses, and has more particular reference to a simple, strong and compact joint or coupling for the engagement of interchangeable cross pieces and legs by means of which a horse of this kind may be readily assembled and taken apart.

One of the principal objects of the invention is in the provision of a knock-down horse in which the parts may be quickly assembled and taken apart, the parts occupying a minimum space for storage and shipment.

A further object of the invention is in the provision of a metal horse coupling adapted to receive stock lumber sizes for its legs and cross pieces and to couple and connect them without other tools, wedges, or equipment for ready assembly and use.

A further object of the invention is in the provision of a light and strong hollow coupling for saw horses into which the cross pieces and supporting legs are loosely inserted, the hollow structure permitting the disengagement of one or more of the parts should they become wedged in the coupling.

Other objects of the invention will appear hereinafter, a preferred embodiment of the invention being illustrated in the accompanying drawing.

In the drawing, Fig. 1 is a perspective of a saw-horse constructed in accordance with the principles of this invention;

Fig. 2 is a section of one of the coupling members; and

Fig. 3 is a transverse section of the coupling as taken on the line 3—3 of Fig. 2.

Supporting horses or saw-horses as commonly used by carpenters and other mechanics, and to a limited extent for household purposes, are objectionable for the reason that they occupy considerable space when not in use and cannot be stored or shipped quickly or compactly. The present invention proposes a hollow metal head into which a cross piece and the legs of stock lumber sizes are inserted loosely and held firmly in the head. No additional tools or fastening means are required to secure the parts together although fastening means may be inserted in the cross pieces and legs if desired.

The parts of the present horse are thus interchangeable and horses of various lengths or heights may be made by simply varying the lengths of the cross pieces and legs.

Referring now more particularly to the drawing, a saw-horse as shown in Fig. 1 comprises a cross piece 4 and legs 5 connected at the ends by a metal head or coupling 6.

In its preferred form, this head 6 is a hollow, metal casting having substantially rectangular sides 7 connected by angular ends 8 with a slot 9 in the top and ends to receive a cross piece 4.

In the under side of the coupling, the ends 8 are provided with inwardly extending short ribs or flanges 10 parallel to and spaced from the sides 7 and together forming a socket for receiving the legs 5. The flanges 10 of one end are joined at the top 11 to strengthen and reinforce the head member 6 and their juncture is just below the lower end of the slot 9.

At the sides of the slot 9 within the head are short ribs 12 for limiting the insertion of the legs 5 and to prevent them from engaging a cross piece 4 in the slot 9.

It will be seen that the engaging portions of the ends 8 have free communication within the head for lightening the casting without decreasing its necessary strength and openings 13 and 14 are also provided in the sides and ends for reducing the weight, and also for providing apertures through which a tool 15 may be inserted for disengaging a cross piece or leg which might become jammed or stuck in the coupling member.

It is also obvious that one or more bosses 16 may be provided at the sides of the slot 9 through which an opening 17 may be provided for a fastening screw 18, or the hole may be provided in the side without any such boss 16. Fastening devices may also be inserted in the openings 13 and 14 for holding the legs in position, but ordinarily they are neither desirable nor necessary.

With this construction it is obvious that the parts may be readily assembled and taken apart; the couplings are made with sockets and slots of an opening to receive stock lumber parts such as 2 x 4's; the parts are simply inserted in the coupling and the jack or horse is complete and ready for use. The parts are as easily taken apart and separated and may be compactly stored for shipment or further use, occupying a minimum space.

I claim:

1. A metal saw-horse head comprising a hollow shell, the sides inclined upwardly with an open slot in the top and ends, and inclined ribs on the insides of the ends and parallel to the sides and joined on each end at the tops below the lower edges of the slot.

2. A metal horse coupling having rectangular sides and triangular ends with an open slot in the top extending downwardly in the ends, ribs on the insides of the ends parallel to and spaced from the sides forming a leg receiving socket, and a projection inclined to the socket at the side of the lower end thereof to limit the insertion of a leg in either socket.

3. A saw-horse comprising a rectangular cross-beam and supporting legs, and metal couplings therefor each comprising a hollow shell with a rectangular top slot extending downwardly at the ends, flanges at the inside of the ends parallel with the sides and joined at the tops forming sockets with the sides and ends for receiving the legs, and a stop rib at the lower side of the slot on each end to prevent a leg inserted in its socket from engaging with the cross beam.

SIDNEY GERRARD.